United States Patent Office 3,044,846
Patented July 17, 1962

3,044,846
PHOSPHONITRILIC ISOTHIOCYANATE PRODUCTS AND METHODS OF PREPARING THEM
Ludwig F. Audrieth, Urbana, Ill., and Rigobert J. A. Otto, Leverkusen-Koeln, Germany, assignors to University of Illinois Foundation, a corporation of Illinois
No Drawing. Filed Apr. 13, 1959, Ser. No. 805,736
15 Claims. (Cl. 23—14)

This invention relates to phosphonitrilic isothiocyanates and products produced therefrom, and the preparation of same. More specifically, this invention relates to chemical structures having a plurality of $NP(NCS)_2$ groups linked to each other and products produced therefrom, and the preparation of such products.

The phrases "phosphonitrilic isothiocyanate(s)" and "phosphonitrilic isothiocyanate product(s)" are herein intended to refer to chemical structures having a plurality of repeating $NP(NCS)_2$ groups or moieties linked to each other. Similarly, the phrases "phosphonitrilic chloride(s)" and "phosphonitrilic chloride product(s)" are intended to refer to products having a plurality of repeating $NPCl_2$ groups or moieties. Further, "available isothiocyanate" herein refers to halogenoid products containing pseudo-halogen groups or moieties that are capable of replacing the halogen atoms (e.g., chlorine atoms) of products such as phosphonitrilic chlorides, with $-N=C=S$ groups.

Many attempts have been made to replace the chlorine atoms of the phosphonitrilic or phosphonitrile chlorides, e.g.,

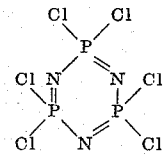

with other structural units in order to prepare derivatives which might be subjected to polymerization to yield elastomeric or polymeric products of greater or enhanced hydrolytic and thermal stability. For example, the chlorides tend to revert to low molecular weight forms during storage and are subject to attack by atmospheric moisture. Consequently, the commercial value of these phosphonitrilic chlorides has been seriously restricted because of their inherent chemical nature.

In an effort to produce phosphonitrilic products having greater stability, attempts have been made to replace the reactive chlorine atoms of phosphonitrilic chlorides with a wide variety of inorganic and organic groups. However, such efforts have not been very successful. For example, treatment of phosphonitrilic chlorides with ammonia produces a series of products known as phosphonitrilamides, which upon heating lose ammonia to form insoluble, infusible materials; these deammoniation products do not, however, possess the desired elastomeric characteristics. The reaction of the phosphonitrilic chlorides with various alcohols and amines produces products which have been reported to be capable of conversion into high molecular weight products; however, the resulting products have not been reported to possess desirable characteristics. Further, despite the fact that the chlorine atoms of phosphonitrilic chlorides have been replaced by other halogen atoms such as fluorine and bromine, the stability characteristics of the polymeric materials produced therefrom are not greatly improved.

We have discovered that when the chlorine atoms of phosphonitrilic chlorides are replaced with pseudo-halogen radicals or moieties such as isothiocyanate groups (i.e., $-N=C=S$), new and useful phosphonitrilic isothiocyanate products are formed that may be used as intermediates or may be polymerized to elastomeric products having resistance to hydrolysis and thermal decomposition.

Phosphonitrilic isothiocyanate products, such as tri- and tetra-phosphonitrilic isothiocyanates (i.e.,

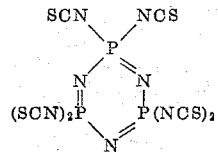

and

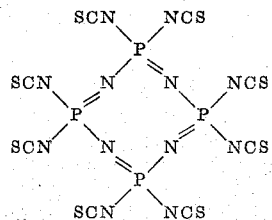

respectively) are remarkable materials. When these products are heated in a vacuum or even in contact with the air at temperatures above about 135° C., preferably above about 150° C., they polymerize to form elastomeric or rubber-like materials which possess considerable stability; polymerization may be conducted in bulk or in solution (e.g., mixed xylenes).

Thus, our invention provides for replacement of the chloro groups of phosphonitrilic chlorides with NCS groups. This substitution reaction also makes it possible, quite unexpectedly, to use relatively low temperatures to effect the polymerization of the phosphonitrilic isothiocyanates to form rubber-like materials and products of enhanced stability. Still further, the presence of a plurality of isothiocyanate groups bonded to phosphorus atoms makes it possible to prepare a wide variety of adducts by reaction with such substances as ammonia, primary and secondary amines and polyamines, alcohols, polyethylene glycols and polyhydroxy compounds, mercaptans, hydrazine and hydroxylamine derivatives. The functional NCS groups are converted by such reactions into derivatives of thiourea, thiosemicarbazide, and related substances; these particular moieties have been found to possess biological activities which suggest their use as pharmaceuticals and pesticides (e.g., fungicidal, fungistatic, bactericidal and bacteriostatic agents). Still further, phosphonitrilic isothiocyanates react with polyhydroxy compounds, polyamino compounds, and other substances containing a plurality of hydroxo and/or amino groupings; thus it has been found that a marked degree of fire retardness is exhibited by cellulose and cellulosic products when they are treated with phosphonitrilic isothiocyanates. It has been still further noted that carbohydrate (e.g., starch) and protein (e.g., albumin) products are coagulated with phosphonitrilic isothiocyanates.

Our phosphonitrilic isothiocyanates are prepared by reacting a phosphonitrilic chloride with available isothiocyanate, whereby the chlorine atoms of the phosphonitrilic chloride are replaced with isothiocyanate groups. The phosphonitrilic chloride may be a tri-, tetra-, penta-, hexa-, hepta-, or poly-phosphonitrilic chloride, or an admixture thereof.

In preparing these phosphonitrilic isothiocyanate products, inert (i.e., inert to the reaction mixture or components thereof), solvents should be used in which phosphonitrilic chlorides are soluble and stable and in which the halogenoid product provides available isothiocyanate (if an inorganic thiocyanate is used, it should be appreciably soluble in the solvent). The driving force of the reaction is characterized by precipitation of a chloride byproduct. Phosphonitrilic chlorides are generally soluble in a wide variety of organic solvents. However, not all such solvents may be used since phosphonitrilic chlorides themselves contain active and labile chlorine atoms which undergo reaction with many organic solvents (e.g., those containing hydroxo and amido groups). A large number of solvents such as ketones (e.g., dialkyl ketones such as methyl ethyl ketone and cycloaliphatic ketones such as methyl cyclohexanone), nitriles (e.g., acetonitrile), tertiary amines (e.g., pyridine), with some ethers (e.g., tetrahydrofuran) may be used as solvents for both the halogenoid source and phosphonitrilic halides; we have found that it is convenient to use inexpensive and readily available ketones (e.g., acetone) to produce the phosphonitrilic isothiocyanate products.

Alkali metal and alkaline earth metal thiocyanates (e.g., sodium, potassium, calcium, and barium) and ammonium and N-substituted ammonium thiocyanates may be used to provide the available isothiocyanate groups. The chlorides of these particular groups and elemental species are relatively insoluble in a number of inert organic solvents in which the phosphonitrilic halides are soluble without reaction. Heavy metal (e.g., silver, lead and mercury) thiocyanates may also be used, but their comparatively low solubility requires that the reaction be permitted to take place over extended periods of time in order to effect formation of appreciable quantities of phosphonitrilic isothiocyanates.

We prefer to use alkali or metallic thiocyanates, potassium thiocyanate in particular, to illustrate our method. When these thiocyanates are used, a solvent should be selected in which the thiocyanates are at least partially soluble.

The following examples are intended to illustrate, but not limit, our method of preparing phosphonitrilic products.

*Example I*

A solution of 35 parts by weight of triphosphonitrilic chloride (i.e., $(NPCl_2)_3$) in 160 parts by weight of acetone was added slowly, with constant agitation, to a solution-slurry of 70 parts by weight of potassium thiocyanate in 160 parts by weight of acetone. Upon completion of this addition, the mixture was warmed for a few minutes and then filtered to remove the precipitated potassium chloride. The filtrate was cooled in a Dry Ice-acetone bath to effect crystallization of the product. The acetone solution was decanted and the crude product was recrystallized from n-heptane. A yield of 41 parts by weight of triphosphonitrilic hexa-isothiocyanate was produced. The product melted at 42° C.

*Analysis.*—Calcd. of $P_3N_3(NCS)_6$: C—14.9%; N—26.1%; P—19.2%. Found: C—15.3%; N—25.8%; P—19.8%.

The triphosphonitrilic hexa-isothiocyanate product of this example was found to be insoluble in water, but very soluble in acetone, benzene and ether. On heating at 150° C. in vacuum, it polymerizes to an elastomeric product that exhibits adhesive properties with glass. It reacts with alcohols to give the corresponding O-alkyl thiocarbamido derivatives (e.g., $P_3N_3(NHCSOR)_6$, wherein R may be an aliphatic, aromatic, or cycloaliphatic group) with ammonia and amines to form thioureido and N-substituted thioureido products (e.g., $P_3N_3(NHCSNH_2)_6$, $P_3N_3(NHCSNHR)_6$ and

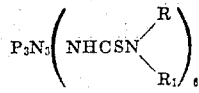

wherein R and $R_1$ are aliphatic, aromatic, or cycloaliphatic groups).

The triphosphonitrilic hexa-isothiocyanate may also be reacted with hydrazines, hydroxylamines and mercaptans to give the corresponding adducts. Furthermore, the product of this example may be reacted with a wide variety of polyhydroxy (e.g., ethylene glycol) and polyamino (e.g., diethylenetriamine and hexamethylene diamine) compounds to give high molecular weight products.

*Example II*

A solution of 47 parts by weight of tetrameric phosphonitrilic chloride (i.e., $(NPCl_2)_4$) in 280 parts by weight of acetone was added slowly, with constant agitation, to a solution-slurry of 79 parts by weight of potassium thiocyanate in 120 parts by weight of acetone.

During the addition, the temperature rose to the boiling point of acetone. After mixing was completed, the reaction mixture was refluxed briefly, after which it was cooled to 0° C., and the precipitated potassium chloride together with the tetrameric isothiocyanate were removed by filtration. The precipitate was leached with water to remove soluble potassium chloride. Alternatively, the solid mixture may be extracted with hot n-heptane to dissolve the desired product. In either case, quantities corresponding to 56 parts by weight of the tetraphosphonitrilic octa-isothiocyanate are obtained.

The pure compound melted at 90° C. and differed from the trimeric compound described in Example I by being less soluble in acetone and other inert solvents.

*Analysis.*—Calcd. for $P_4N_4(NCS)_8$: C—14.9%; N—26.1%; P—19.2%; S—39.8%. Found: C—15.2%; N—25.9%; P—19.5%; S—40.2%.

The tetrameric product, like the trimeric isothiocyanate, reacts with ammonia, amines and polyamines, with alcohol and poly-hydroxy compounds, with hydrazines, hydroxylamines, and mercaptans to yield the corresponding adducts. Further, it polymerizes, upon heating in vacuum above about 140° C. to form rubber-like polymers that exhibit adhesive properties for bonding glass surfaces to each other.

The foregoing detailed description has been given for clearness of understanding only, and no unnecessary limitations should be understood therefrom, as modifications will be obvious to those skilled in the art.

We claim:

1. The method of producing phosphonitrilic isothiocyanates comprising reacting phosphonitrilic chloride with a salt of thiocyanic acid to replace chlorine atoms of the phosphonitrilic chloride with —N=C=S groups.

2. The method of claim 1 wherein the salt of thiocyanic acid is an alkali metal thiocyanate.

3. The method of claim 1 wherein the salt of thiocyanic acid is ammonium thiocyanate.

4. The method of claim 1 wherein the salt of thiocyanic acid is potassium thiocyanate.

5. The method of producing polymeric phosphonitrilic isothiocyanate comprising reacting phosphonitrilic chloride with a salt of thiocyanic acid whereby the chlorine atoms of the phosphonitrilic chloride are replaced with NCS groups to form phosphonitrilic isothiocyanate, and polymerizing the resulting phosphonitrilic isothiocyanate to form polyphosphonitrilic isothiocyanate having repeating $[NP(NCS)_2]$ groups.

6. The method of claim 5 wherein polymerization is conducted at at least about 135° C.

7. The method of claim 5 wherein the polyphosphonitrilic isothiocyanate resulting from polymerization is an elastomer having repeating $[NP(NCS)_2]$ groups.

8. The method of claim 5 wherein polymerization is conducted at at least about 135° C. and the resulting polyphosphonitrilic isothiocyanate is a homopolymer and an elastomer.

9. The method of producing phosphonitrilic isothiocyanates comprising reacting phosphonitrilic chloride with a salt of thiocyanic acid in the presence of a solvent in which the phosphonitrilic chloride is soluble and nonreactive and in which said salt provides isothiocyanate groups.

10. The method of claim 9 wherein the solvent contains acetone.

11. Phosphonitrilic isothiocyanate having repeating [NP(NCS)$_2$] groups and having the formula

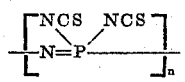

wherein $n$ is at least 3.

12. The product of claim 11 wherein the phosphonitrilic isothiocyanate is an elastomer.

13. The product of claim 11 wherein the phosphonitrilic isothiocyanate is a homopolymer that is an elastomer.

14. The phosphonitrilic isothiocyanate of claim 11 wherein $n$ is 3.

15. The phosphonitrilic isothiocyanate of claim 11 wherein $n$ is 4.

References Cited in the file of this patent

UNITED STATES PATENTS 2,713,008   Schulenburg _____ July 12, 1955
2,898,180   Holbrook _____ Aug. 4, 1959